United States Patent
Hunger et al.

(10) Patent No.: US 10,751,907 B2
(45) Date of Patent: Aug. 25, 2020

(54) WOOD TREATMENT APPARATUS WITH A DISPLACEABLE SLEEVE FOR TREATING WOOD AND METHOD FOR TREATING WOOD

(71) Applicant: IML Instrumenta Mechanik Labor GmbH, Weisloch (DE)

(72) Inventors: Erich Hunger, Karlsruhe (DE); Sebastian Hunger, Wiesloch (DE); Fabian Hunger, Leimen (DE)

(73) Assignee: IML Instrumenta Mechanik Labor GmbH, Wiesloch (DE)

(*) Notice: Subject to any disclaimer, the term of this patent is extended or adjusted under 35 U.S.C. 154(b) by 0 days.

(21) Appl. No.: 16/323,016

(22) PCT Filed: Aug. 2, 2017

(86) PCT No.: PCT/EP2017/000932
§ 371 (c)(1),
(2) Date: Feb. 4, 2019

(87) PCT Pub. No.: WO2018/033233
PCT Pub. Date: Feb. 22, 2018

(65) Prior Publication Data
US 2019/0168408 A1    Jun. 6, 2019

(30) Foreign Application Priority Data

Aug. 18, 2016   (DE) .................. 10 2016 009 909

(51) Int. Cl.
*B27K 3/02* (2006.01)
*B27K 3/10* (2006.01)

(52) U.S. Cl.
CPC .......... *B27K 3/0235* (2013.01); *B27K 3/0257* (2013.01); *B27K 3/105* (2013.01); *B27K 2240/20* (2013.01)

(58) Field of Classification Search
CPC .... B27K 3/0235; B27K 3/105; B27K 3/0257; B27K 2240/20
See application file for complete search history.

(56) References Cited

U.S. PATENT DOCUMENTS

| | | | |
|---|---|---|---|
| 1,999,458 A | 4/1935 | Hollister | |
| 3,706,161 A | 12/1972 | Jenson | |
| 4,389,446 A * | 6/1983 | Blom | A01N 31/10 424/413 |
| 4,596,088 A * | 6/1986 | Graber | A01G 7/06 47/57.5 |
| 5,443,641 A * | 8/1995 | Helsing | B27K 3/0235 118/407 |
| 5,478,394 A * | 12/1995 | Bidaux | B27K 3/105 118/407 |
| 2017/0212095 A1 | 7/2017 | Hunger et al. | |

FOREIGN PATENT DOCUMENTS

| | | | |
|---|---|---|---|
| CH | 632697 A5 * | 10/1982 | ............ A01N 25/00 |
| DE | 926 160 | 4/1955 | |
| DE | 926 161 | 4/1955 | |
| DE | 2 021 647 | 1/1971 | |
| DE | 3915564 A1 * | 12/1990 | ......... E04G 23/0203 |
| DE | 4309713 A1 * | 10/1993 | ............ B27K 3/105 |
| DE | 10 2014 015 051 | 10/2015 | |
| EP | 0100703 A1 * | 2/1984 | ............ B27K 3/105 |
| FI | 63685 B * | 4/1983 | ............ B27K 3/105 |
| FR | 2 259 534 | 8/1975 | |
| FR | 2 260 430 | 9/1975 | |
| FR | 2386399 A1 * | 11/1978 | ............ B27K 3/105 |
| FR | 2743326 A1 * | 7/1997 | ............ B27K 3/105 |
| JP | 201820527 A * | 2/2018 | |
| SE | 356 921 | 6/1973 | |
| WO | 93/08694 | 5/1993 | |
| WO | WO-9308694 A1 * | 5/1993 | ............... C12N 1/14 |

* cited by examiner

*Primary Examiner* — William P Fletcher, III
(74) *Attorney, Agent, or Firm* — Gudrun E. Huckett

(57) ABSTRACT

A wood treatment apparatus for long-term treatment of wood has a cylindrical hollow body and a sleeve. The cylindrical hollow body has an inner end, during use located within the wood, an outer end, directed away from the inner end, an exit opening and an accommodating space accommodating a carrier material containing active wood-treatment substance. The sleeve is arranged around the cylindrical hollow body and, when the apparatus is not in use, closes the exit opening and, when the apparatus is used, frees the exit opening and brings the accommodating space into contact with the wood. The method provides driving the apparatus into the wood to position the exit opening near a site to be treated and displacing the sleeve to bring the accommodating space into contact with the wood, wherein the apparatus remains in the wood to allow the wood-treatment substance to be released pressureless into the wood.

19 Claims, 3 Drawing Sheets

WOOD TREATMENT APPARATUS WITH A DISPLACEABLE SLEEVE FOR TREATING WOOD AND METHOD FOR TREATING WOOD

BACKGROUND OF THE INVENTION

The invention concerns a wood-treatment apparatus for the treatment of wood and a method for the treatment of the wood.

It is known in the prior art that wood poles, tree trunks, and other wood objects are subjected to a check from time to time with which the condition of the existing wood, its impregnation and/or further properties that are decisive for the stability and bearing capacity are examined. In this context, the examination of decay in the interior is an important examination with regard to stability. Further examinations are performed by means of drilling resistance measurements.

DE 10 2014 015 051 B3 discloses a wood testing tool and a method that enables an examination of the impregnation depth of impregnated wood in that the wood testing tool is driven into the wood and thereby a wood sample is stamped out that can be subjected to a visual inspection By means of such examinations, it is determined how much the wood is damaged and whether the remaining healthy wood is sufficient for the stability. When the wood is damaged too much, the pole must be replaced or the tree must be felled. A treatment of the wood has hardly been possible up to now.

Furthermore, it is known in the prior art that, for depth treatment of wood, impregnation liquid is introduced into the wood under high pressure by means of a device. Such a device is disclosed, for example, in DE 2 021 647 U. This impregnation is to be performed preventively and is very complex due to the requirement of high pressures.

Such high pressure devices employ in general screw-in nozzles that are screwed into the wood in order to prevent the nozzle from kicking back upon high-pressure application. These screw-in nozzles are connected to a pressure container for providing the inoculation liquid under high pressure. In order to be able to pressurize the pressure container when the screw-in nozzle is not secured in the wood, DE 926 160 B and DE 926 161 B describe a valve piston which is supported in the interior of such a screw-in nozzle and can be actuated by an axially slidable sleeve that is guided at the exterior side of the nozzle and is supported against the wood surface when screwing in the nozzle into the wood and thereby opens the valve in that the valve piston is lifted off the valve seat.

DE 20 21 647 discloses an injection device for depth treatment of wood which remains within the wood in order to prevent that the protective liquid, when injected at high pressure into the wood, flows out to the exterior. This injection device comprises a cylindrical hollow body having, at its end projecting from the wood piece, a head with a through opening in order to connect thereto an injection device that provides a wood-protecting liquid at high pressure of 50 to 100 bar. Moreover, the cylindrical hollow body comprises in the head a ball that is supported on radially inwardly projecting ribs and closes off the through opening when it is pushed against it by returning liquid, and a return flow of the liquid, injected at high pressure, to the exterior is prevented in this way.

Moreover, fungicides are known that themselves contain fungi and are used for treating wood affected by decay or for prevention. Such a fungicide is disclosed, for example, in WO 93/08694.

Based on this prior art, it is the object of the present invention to provide an apparatus with which a treatment of wood in which decay has been found is enabled in a simple way.

SUMMARY OF THE INVENTION

This object is solved by a wood-treatment apparatus comprised of a cylindrical hollow body and a sleeve, wherein
the cylindrical hollow body comprises an inner end that in use is located within the wood, an outer end that is facing away from the inner end, at least one exit opening, and an accommodating space which is configured for accommodating a carrier material with active wood-treatment substance,
and wherein
the sleeve is arranged to contact circumferentially the cylindrical hollow body and causes the at least one exit opening of the cylindrical hollow body
to be closed off in a state of non-use of the wood-treatment apparatus and
to be released in a state of use of the wood-treatment apparatus, and the sleeve brings the accommodating space into contact with the wood.

The further object of providing a method for the treatment of wood affected by decay is solved by the method with the features of independent claim 10 comprising the steps:
a) providing the cylindrical hollow body and the sleeve of the wood-treatment apparatus,
b) introducing the carrier material with the active wood-treatment substance into the accommodating space of the cylindrical hollow body of the wood-treatment apparatus and closing off the at least one exit opening by arranging the sleeve about the cylindrical hollow body,
c) driving the wood-treatment apparatus into the wood, thereby displacing the sleeve or compressing the length of the sleeve, and thereby releasing at least one exit opening and bringing into contact the accommodating space with the wood, and allowing the wood-treatment apparatus to remain in the wood and thereby releasing the active wood-treatment substance.

Further developments of the apparatus and of the method are disclosed in the dependent claims.

In a first embodiment of the wood-treatment apparatus according to the invention for the treatment of wood, it comprises a cylindrical hollow body with an inner end that in use is located inside the wood and with an outer end which is facing away from the inner end. The cylindrical hollow body has moreover one or several exit openings and comprises an accommodating space which is configured for accommodating a carrier material with active wood-treatment substance. According to the invention, the wood-treatment apparatus moreover comprises a sleeve that is contacting circumferentially the cylindrical hollow body and closes off the exit opening or the several exit openings in a state of non-use of the wood-treatment apparatus and releases them in a state of use of the wood-treatment apparatus and brings the accommodating space in contact with the wood.

In this context, "the treatment of wood" means the treatment of wood poles or other wood objects but also in living wood at tree trunks or branches. "Bringing into contact" of the accommodating space with the wood means that, between wood and accommodating space in the hollow body, an open connection is provided via the exit openings so that the active wood-treatment substance can exit via the exit openings and pass into the wood.

"State of non-use" means in this context the state prior to a use in which the accommodating space is present filled with the carrier material including the active wood-treatment substance and closed off by the sleeve, and "state of use" means the state in which the wood-treatment apparatus has been introduced into the wood wherein the sleeve releases at least one exit opening.

The method for treatment provides for inserting or driving in the wood-treatment apparatus for use and thereby pushing back the sleeve, or compressing it with regard to its length, so that the exit opening or exits openings are positioned in or near the locations to be treated. By pushing away the sleeve, the exit opening(s) are released. The accommodating space is thus brought into contact with the surrounding wood.

Upon direct or even indirect contact of the carrier material with the wood, the active wood-treatment substance can spread away from the carrier material and pass into the wood.

The distribution or spreading of the active wood-treatment substance takes a different course, depending on whether the carrier material is a liquid that can exit together with the active wood-treatment substance through the exit opening or an absorber that remains in the accommodating space and permits the distribution of the active wood-treatment substance, or, on the other hand, whether the carrier material with the active wood-treatment substance is a powder-like or granular solid or a fluid, preferably a fluid with an at least honey-like viscosity beyond approximately $10^4$ mPa s. Active wood-treatment substance can be released or dissipated also from a powder or granular active substance and can correspondingly pass from the apparatus into the wood, also dependant on the weather and other conditions.

The cylindrical hollow body remains in the wood so that the active wood-treatment substance can spread over an extended period of time and must not be pressed by high pressure into the desired regions.

This means in particular that the sleeve of the apparatus according to the invention, in contrast to the prior art, is not connected to a valve piston—because such a piston is unnecessary in the present apparatus—but serves only to release or open in a targeted fashion one or several exit opening(s), and means furthermore that the apparatus is configured such that a substance contained in the accommodating space of the wood-treatment apparatus passes into the wood only after releasing the openings. In this context, "passing" is to be understood as a pressureless transfer. Since the wood-treatment apparatus remains within the wood, it is thus permitted that the carrier substance or the active wood-treatment substance passes into the wood exclusively by effects such as capillary action and/or diffusion. In contrast to conventional injection devices in which the active wood-treatment substance is introduced under high pressure by means of screw-in nozzles after the valve piston which is present in the nozzle has been opened by means of the externally positioned sleeve, the structure of the wood is not negatively affected by a high-pressure action due to the pressureless introduction according to the invention.

The wood treatment may be a preventive treatment but also a treatment of damaged regions, for example, regions with decay caused by fungi. When a site affected by fungi is to be treated, it is possible to employ an antagonist. This means that another wood fungus is employed that does not damage the wood but is so dominant that it displaces the harmful fungus. This antagonist spreads like the harmful fungus in the wood; in this context, not only days but weeks and months will pass. Important in this context is only that the antagonist spreads faster than the harmful fungus so that the harmful fungus is displaced before the damage to the wood becomes too great. The active wood-treatment substance therefore develops, for example, when it contains an antagonist, its effect over an extended period of time—therefore, "long-term treatment" means also the longer time that is required so that the fungus colony like that of an antagonist can grow against a harmful fungus. "Long-term" is thus a relative term which may mean at least several days but also several weeks or months, depending on the environmental conditions such as weather, harmful fungus infestation, distribution/spread of the harmful fungus, etc.

A multitude of further applications is possible—it must not be mandatorily a fungus treatment but also the treatment of other tree diseases or infestation of the tree or wood, for example, by beetles that are expelled by introducing an active wood-treatment substance.

"Remaining in the wood" of the apparatus thus relates to that tha latter may indeed remain in the wood over weeks and months, or even permanently, at the site of treatment.

This antagonist, or another wood-treatment agent, is accommodated by a carrier material. In this context, the carrier material can be a solid and can absorb the substance or can also be present in the liquid state wherein the substance is incorporated into this liquid. The carrier material is introduced into the accommodating space of the cylindrical hollow body and closed off by the sleeve.

In an embodiment of the wood-treatment apparatus, the accommodating space is already filled with carrier material and active wood-treatment substance so that the wood-treatment apparatus can be employed directly for use. Conceivable are wood-treatment apparatus that can be employed for different applications, preventively or against an infestation, which are provided with different active substances. In this context, very special active substances as well as broad-range active substances, biological or chemical products, and carrier materials are possible.

In an embodiment of the wood-treatment apparatus, the sleeve comprises an elastic material, for example, from a group of materials that comprises silicone, plastic material, and rubber. The sleeve is arranged around the cylindrical hollow body so as to be displaceable or compressible with regard to its length. Upon transfer into the state of use, the sliding-in or driving-in action, optionally pushing in, of the wood-treatment apparatus into the wood, the sleeve is retained by the surrounding wood so that the sleeve is displaced or compressed along the cylindrical hollow body. In this context, the receiving opening(s) is/are released beginning at the inner end of the cylindrical hollow body.

Moreover, one or several exit opening(s) of the cylindrical hollow body can be present at its wall surface. When several exit openings are provided, they can be distributed in a regular or random pattern across the wall surface. The shape of the exit opening(s) can be round or elongate. Thus, the exit openings of the cylindrical hollow body positioned on the wall surface can have various shapes. For example, holes or elongate holes drilled into the cylindrical hollow body but also slots in length direction or transverse direction can be provided. Conceivable are also slots wound in a coil shape along the wall surface or polygonal cutouts. The number and arrangement of these exit openings can be selected to be different. For example, one or several rows of exit openings but also randomly and/or unevenly distributed exit openings are conceivable.

The accommodating space can advantageously be divided by at least one wall into chambers. Each of the chambers comprises at least one of the exit openings. The wall can divide in this context the accommodating space into several chambers arranged one behind the other in axial direction. However, it can also extend itself in axial direction and thus divide the accommodating space into several chambers distributed in circumferential direction. In this way, it is possible to drive the cylindrical hollow body piece by piece into the wood, for example, over an extended period of time, and to open thereby further chambers. Depending on the embodiment of the apparatus, chambers can thus be increasingly "switched on" over the duration of the treatment by releasing or opening the corresponding exit openings which are assigned to the respective chamber. Due to the residence of the apparatus in the wood over longer periods of time, a treatment over longer periods of time that may amount to days, weeks or even months can thus be performed.

In this embodiment with an accommodating space divided into several chambers as well as also in the simplest embodiment with a single undivided accommodating space, the latter is filled with the carrier material with active wood-treatment substance prior to driving the apparatus into the wood. A complicated filling or refilling action on site is therefore advantageously unnecessary.

The cylindrical hollow body comprises a head at its outer end. This head can be a flattened drive-in head so that the wood treatment device can be driven, for example, by means of a hammer, into the wood. This is advantageous in case of solid wood because otherwise the cylindrical hollow body may be deformed by being hit with the hammer. The head may however also be embodied like a type of grip which enables gripping, with the fingers, the wood treatment device. For example, knob-like or ball-shaped grips are possible.

The head of the wood-treatment apparatus can moreover be removable so that the carrier material can be filled simply from the outer end of the cylindrical hollow body into the accommodating space prior to the head being attached. It is thus also possible to refill the wood-treatment apparatus by removing the head wherein this can be done within the wood or the wood-treatment apparatus is removed from the wood for this purpose.

The head for refilling can moreover be designed as a specially designed head with opening.

At the inner end, the cylindrical hollow body can have a drive-in tip that facilitates driving in or sliding in the wood-treatment apparatus in that it facilitates displacement of the wood upon introducing the cylindrical hollow body.

The wood-treatment apparatus can be produced of different materials. In one embodiment, a section of the cylindrical hollow body positioned between the head and the drive-in tip is comprised of aluminum and at least one of the sections drive-in tip and head of brass or steel. However, other advantageously harder materials are possible also with which a higher strength for driving into solid wood can be achieved. For the wood treatment of living wood at tree trunks or branches, all sections can be produced of stainless steel so that a corrosion or a transfer of components into the wood is prevented. In case of the presence of a hole in which the wood-treatment apparatus is to be accommodated, i.e., the hardness is not decisive, also variants of wood or plastic material are conceivable.

The wood-treatment apparatus in one embodiment is designed such that the hole into which it has been inserted for wood treatment or which is created by the drive-in action is water-tightly closed off. In particular, the head of the wood-treatment apparatus can be designed such that the hole in the wood in which the cylindrical hollow body is positioned in the state of use of the wood-treatment apparatus is closed off water-tightly by the head. Due to the permanent residence of the wood-treatment apparatus in the wood, whereby the bore which has been created in the wood upon introduction of the wood-treatment apparatus is closed off, the penetration of further moisture, which favors the spreading of the decay, or of other harmful organisms can be prevented.

The wood-treatment apparatus can comprise at the exterior side of the wall surface of the cylindrical hollow body also anchoring means which secure the wood-treatment apparatus in the state of use in the wood. These anchoring means are arranged at the inner end of the cylindrical hollow body at which no exit openings are present so that the sleeve is also not positioned in this region of the cylindrical hollow body. A displacement of the sleeve toward the outer end is still possible thereby. The anchoring means can be designed barb-like so that they permit an inserting or drive-in action into the wood but not pulling out or sliding out of the wood-treatment apparatus. Due to the anchoring means, the cylindrical hollow body forms a type of wall plug which is to be anchored in a hole.

A method according to the invention for the treatment of wood is realized by use of a wood-treatment apparatus according to the invention. The method comprises in a first embodiment the following steps:

a) providing the cylindrical hollow body and the sleeve of the wood-treatment apparatus, b) introducing the carrier material with the active wood-treatment substance into the accommodating space of the cylindrical hollow body of the wood-treatment apparatus and closing off the at least one exit opening by arranging the sleeve about the cylindrical hollow body, c) driving the wood-treatment apparatus into the wood, thereby displacing or compressing the sleeve, and thereby releasing at least one exit opening and bringing into contact the accommodating space with the wood, wherein the wood-treatment apparatus is allowed to remain in the wood so that the release of the active wood-treatment substance is realized without applying pressure.

The wood-treatment apparatus is placed against the wood and introduced, whereby sleeve and cylindrical hollow body separate, or at least the sleeve is sliding in the direction toward the head. The cylindrical hollow body is driven into the wood and remains therein. Since the sleeve is removed or pushed back, the exit openings are exposed and in contact with the wood and the active wood-treatment substance can dissipate from the accommodating space into the wood via the exit openings.

According to a further development of the method according to the invention, in step d) leaving behind the cylindrical hollow body in the wood is realized after completely driving in the cylindrical hollow body of the wood-treatment apparatus into the wood.

According to yet a further development of the method according to the invention, in step c) the wood-treatment apparatus is driven into a hole which is present in the wood. In this context, this hole can have been created by removing a wood sample, by a drilling resistance measurement, or a similar wood testing action, or can have been drilled especially for the treatment. The hole can have existed in the wood already for a longer period of time or can have been created shortly before introducing the wood-treatment apparatus.

Moreover, prior to step a), the following steps can be performed:

a') removing a wood sample of the wood for examination in regard to decay, a") examining the wood sample with respect to the decay-causing fungus type, a'") selecting suitable active wood-treatment substances.

Furthermore, the method can comprise the introduction of the selected active wood-treatment substance into the carrier material. In this context, it is not important whether the removal and examination of the wood sample is carried out temporally separate from the wood treatment or immediately before.

For the wood treatment, the wood-treatment apparatus must not be inserted or driven completely into the wood. It is instead expedient that the wood-treatment apparatus is driven only to a predetermined depth into the wood so that the exit openings are positioned such that the carrier material and thus the active wood-treatment substance is released in a targeted way at and adjacent to the affected site or the site to be treated preventively.

Further embodiments as well as some of the advantages which are associated with these and further embodiments will become apparent and better understood through the following detailed description with reference to the accompanying Figures. Objects and parts thereof which are substantially identical or similar, may be provided with the same reference characters. The Figures are only a schematic illustration of an embodiment of the invention.

BRIEF DESCRIPTION OF THE DRAWINGS

It is shown in this context in.

DESCRIPTION OF PREFERRED EMBODIMENTS

Figure 3:
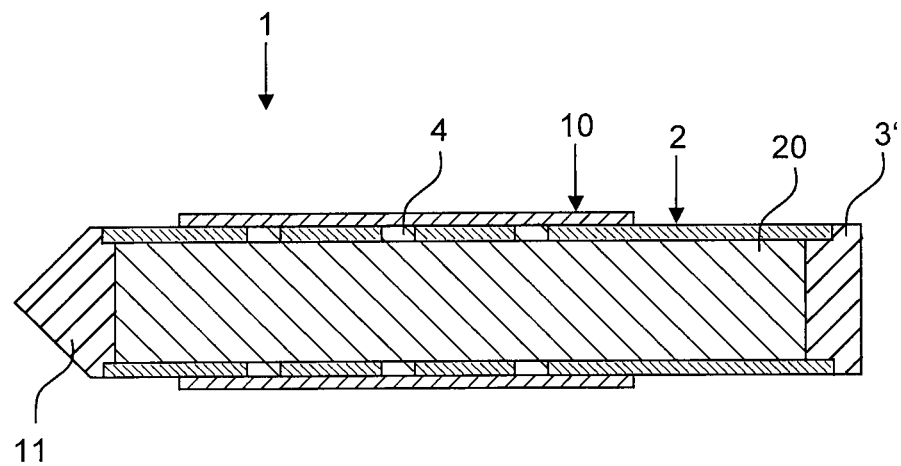
FIG. 3 a longitudinal section of a wood-treatment apparatus.
Figure 4:
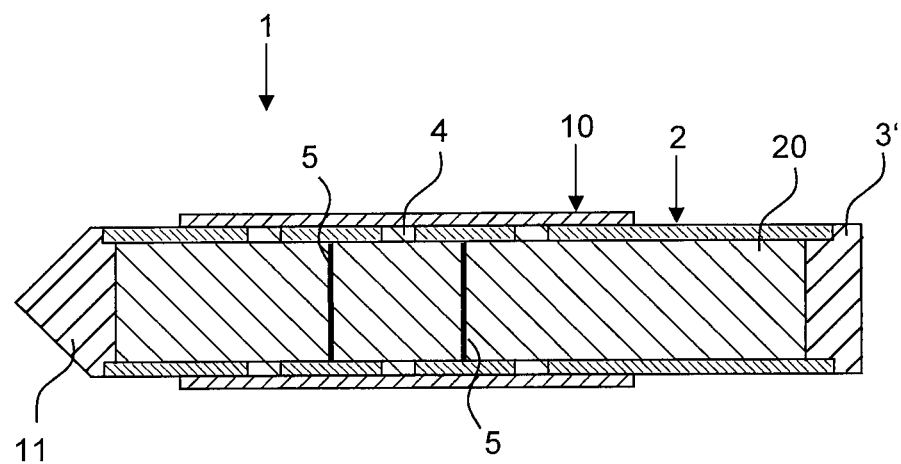
FIG. 4 a longitudinal section of the wood-treatment apparatus with several chambers.
Figure 6:
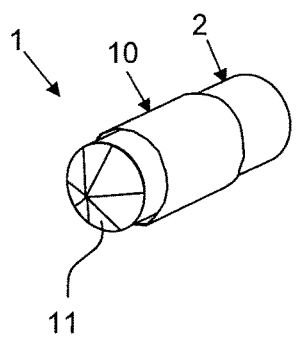
FIG. 6 a perspective detail view of the wood-treatment apparatus.

The apparatus according to the invention is a wood-treatment apparatus 1 as illustrated in FIGS. 3, 4, and 6.

Figure 1:
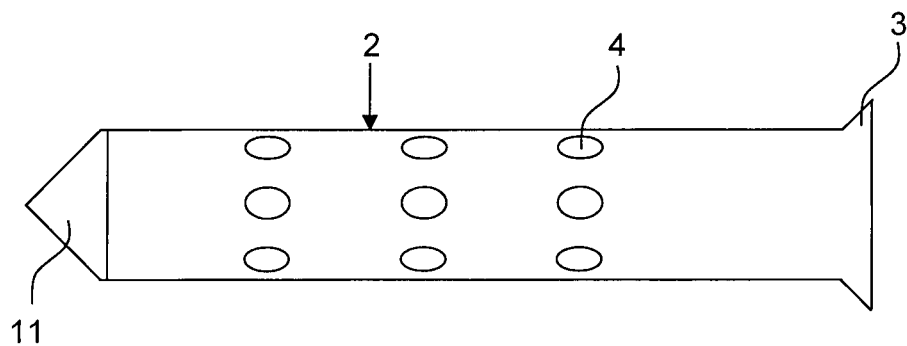
FIG. 1 a side view of the cylindrical hollow body of a wood-treatment apparatus without sleeve.
Figure 2:
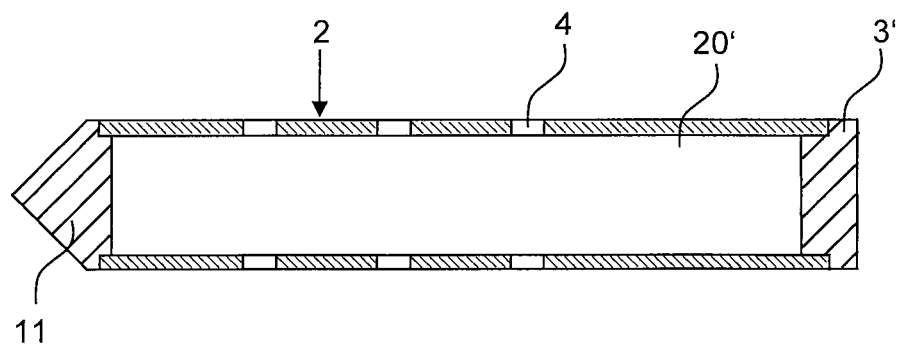
FIG. 2 a longitudinal section of a cylindrical hollow body for the wood-treatment apparatus of FIG. 1, without sleeve and without carrier material.
Figure 5:
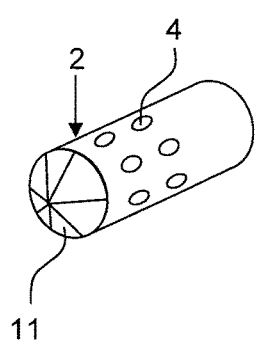
FIG. 5 a perspective detail view of the cylindrical hollow body of a wood-treatment apparatus.

This wood-treatment apparatus 1 is embodied of a cylindrical hollow body 2 as shown, for example, in FIGS. 1, 2, and 5 and a sleeve 10. In this context, the cylindrical hollow body 2 comprises at least one accommodating space 20' that can accommodate carrier material 20 with an active wood-treatment substance. In this context, embodiments are possible in which the carrier material 20 with the active wood-treatment substance is still to be filled into the accommodating space/the accommodating spaces 20' but also ready-filled wood treatment apparatus 1 for different applications with different active wood-treatment substances that are selected for the respective use. The cylindrical hollow body 2 has an inner end which is positioned in use within the wood and an outer end facing away therefrom as well as several exit openings 4 which are elliptical here. These exit openings 4 in the state of non-use are closed off by the sleeve 10 and, in the state of use, can be released by displacing or by compressing the length of the sleeve 10. The sleeve 10 is pulled across the cylindrical hollow body 2 and contacts it circumferentially. In this context, the sleeve 10 can be made of an elastic material and slightly tensioned by the cylindrical hollow body 2 so that it is seated more tightly on the cylindrical hollow body 2 and cannot be accidentally displaced. The sleeve 10 could however also be comprised of rigid material such as plastic material, wood, or metal. Then its inner diameter is matched to the outer diameter of the cylindrical hollow body 2 so that the inner side of the sleeve 10 is still contacting the wall surface of the cylindrical hollow body 2 and is displaceable.

Not illustrated is the situation during insertion of the wood-treatment apparatus into the wood. For example, by means of the drive-in tip a hole is formed or the hole is alternatively already present, for example, prepared by a drill. Into the hole whose inner diameter corresponds to the outer diameter of the cylindrical hollow body, the latter is inserted into the wood. The sleeve is retained by the wood because the outer circumference of the cylindrical hollow body and sleeve is greater than the hole. The sleeve is displaced and releases the exit openings. Thereby, gradually, the exit openings that are already positioned within the wood are released. A softer, respectively, elastic sleeve can also be compressed with respect to its length instead of being displaced. In this context, the inner end of the sleeve is pushed toward the outer end and the sleeve becomes undulated so that its extension becomes smaller in length direction of the cylindrical hollow body.

FIGS. 1 and 2 show the cylindrical hollow body 2 of the wood-treatment apparatus 1 of FIG. 3 with several exit openings 4 on its wall surface which are distributed on three circumferential lines.

In FIG. 5, the cylindrical hollow body 2 is provided with two rows of exit openings 4. FIG. 6 shows the wood-treatment apparatus 1 in the closed state of non-use. Here the exit openings 4 at the wall surface of the cylindrical hollow body 2 are closed by the sleeve 10. In FIG. 5, the open state of use is illustrated as it occurs within the wood. Here, the exit openings 4 at the wall surface are released, the sleeve 10 is already completely stripped off.

The exit openings 4 can have different shapes. In the Figures, oval exit openings 4 in the wall surface of the cylindrical hollow body 2 are illustrated. They can have however also round, polygonal, elongate or other shapes. Thus, different shapes of the exit openings 4 of the cylindrical hollow body 2 are possible also. Also, the number of the exit openings 4 can vary; it is thus also possible that only a single exit opening 4 is present as well as a multitude of exit openings 4 which may be distributed in defined arrangements such as one or several rows or spirally but also randomly distributed.

FIG. 4 shows a wood-treatment apparatus 1 in which the cylindrical hollow body 2 comprises walls 5 in the interior which divide the accommodating space 20' into several chambers. Illustrated is a division into chambers which are arranged one behind the other in longitudinal direction of the cylindrical hollow body 2.

A division by walls that extend in longitudinal direction of the cylindrical hollow body is not illustrated. The chambers extend then also in longitudinal direction. Also, walls in different orientations and overlapping walls are conceivable so that one or a few large accommodating spaces can be formed which are correlated with one or several exit openings, or several accommodating spaces are formed which are each assigned to at least one exit opening.

In FIG. 2, an embodiment is illustrated in which the outer end of the cylindrical hollow body 2 has a head 3 which is designed as a flattened drive-in head 3'. This flattened drive-in head 3' forms the impact surface when the wood-treatment apparatus 1 must be driven into solid wood or a smaller hole.

The head 3 can be designed in various ways. For example, instead of the flattened drive-in head 3', an open end of the cylindrical hollow body 2 can also form the head 3.

Another embodiment, also not illustrated, comprises a grip as the head with which the wood-treatment apparatus 1 can be held between the fingers so that it can be introduced more easily into a hole in the wood. This grip can be ball-shaped or knob-shaped or even ergonomically matched to the shape of the fingers during gripping.

In FIG. 1, the inner end of the cylindrical hollow body 2 is a drive-in tip 11. The drive-in tip 11 facilitates the introduction of the wood-treatment apparatus 1 into the wood. Thus, it is also possible to drive the wood-treatment apparatus 1 like a nail into solid wood.

Figure 7:
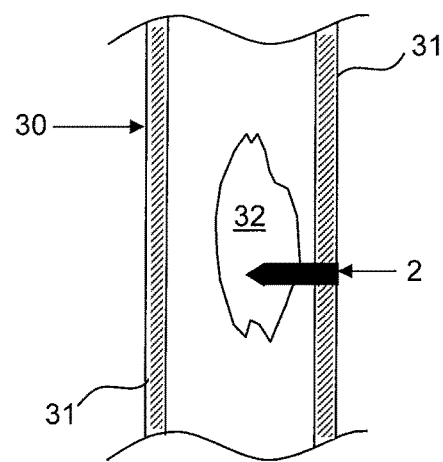
FIG. 7 a longitudinal section of an impregnated wood piece with decay treated according to the invention, with a cylindrical hollow body of the wood-treatment apparatus left behind therein.

FIG. 7 shows the application of the wood-treatment apparatus 1 after the sleeve 10 has been stripped off and only the cylindrical hollow body 2 remains in the trunk 30 which exhibits an impregnated region 31 and an affected region 32.

In this context, the wood-treatment apparatus 1 is introduced into the wood such that it reaches the affected region 32 and the exit openings 4 are positioned in or near this region and the active wood-treatment substance can spread from here.

The cylindrical hollow body must not mandatorily be completely driven into the wood.

The drive-in depth can be selected such that the exit openings are positioned in the desired position. The wood-treatment apparatus can be configured such that it water-tightly closes off the hole, into which it has been inserted or that has been created by the driving-in action. Thus, penetration of water can be prevented.

For anchoring or fastening in the wood, the wood-treatment apparatus may comprises anchoring means. They are advantageously arranged at the exterior side of the wall surface of the cylindrical hollow body and secure the wood-treatment apparatus in the wood. These anchoring means are not illustrated in the Figures.

LIST OF REFERENCE CHARACTERS 1 wood treatment apparatus
2 cylindrical hollow body
3 head
3' flattened drive-in head
4 exit opening
5 wall
10 sleeve
11 drive-in tip
20 carrier material
20' accommodating space
30 pole/tree trunk
31 impregnated region
32 affected region

What is claimed is:

1. A wood-treatment apparatus configured for a long-term treatment of wood, wherein the long-term treatment is defined as lasting several days to several months, the wood-treatment apparatus comprising:
a cylindrical hollow body comprising: an inner end that, in a position of use of the wood-treatment apparatus, is located within the wood; an outer end facing away from the inner end; a cylindrical wall surface comprising at least one exit opening; and an accommodating space surrounded by the cylindrical wall surface and accommodating a carrier material with an active wood-treatment substance active against tree diseases or tree infestations;
a sleeve arranged circumferentially around the cylindrical hollow body, wherein the sleeve closes off the at least one exit opening of the cylindrical wall surface in a state of non-use of the wood-treatment apparatus;
wherein the sleeve is displaceable or compressible such that, when the wood-treatment apparatus is inserted or driven into the wood to position the at least one exit opening in or near a site to be treated in the position of use of the wood-treatment apparatus, the sleeve is retained by the surrounding wood and displaced axially along the cylindrical hollow body toward the outer end or axially compressed;
wherein the sleeve, by being displaced or compressed, opens the at least one exit opening in a direction from the inner end toward the outer end and the at least one exit opening provides an open connection between the accommodating space and the wood;
wherein, via the open connection, the active wood-treatment substance active against tree diseases or tree infestations passes pressureless into the wood by capillary action and/or by diffusion.

2. The wood-treatment apparatus according to claim 1, wherein the active wood-treatment substance active against tree diseases or tree infestations is an antagonist, wherein the carrier material is an absorber or a liquid, wherein the antagonist is absorbed in the absorber or incorporated in the liquid.

3. The wood-treatment apparatus according to claim 1, wherein the carrier material with the active wood-treatment substance active against tree diseases or tree infestations is a powder or a granular solid.

4. The wood-treatment apparatus according to claim 1, wherein the carrier material with the active wood-treatment substance active against tree diseases or tree infestations is a fluid with a viscosity beyond $10^4$ mPa s.

5. The wood-treatment apparatus according to claim 1, wherein the sleeve comprises an elastic material selected from the group consisting of silicone, plastic material, and rubber.

6. The wood-treatment apparatus according to claim 1, wherein a plurality of the at least one exit opening are provided and are distributed in a regular pattern or randomly across the cylindrical wall surface.

7. The wood-treatment apparatus according to claim 1, wherein the at least one exit opening is round or elongate.

8. The wood-treatment apparatus according to claim 1, wherein the accommodating space is divided by at least one wall into chambers, wherein the chambers each have at least one of the at least one exit opening associated therewith.

9. The wood-treatment apparatus according to claim 1, wherein the outer end of the cylindrical hollow body comprises a head, wherein the head is a flattened drive-in head or a grip for gripping the wood-treatment apparatus.

10. The wood-treatment apparatus according to claim 1, wherein the inner end of the cylindrical hollow body comprises a drive-in tip.

11. The wood-treatment apparatus according to claim 1, wherein the outer end of the cylindrical hollow body comprises a head configured to water-tightly close off a hole in the wood, in which the cylindrical hollow body is positioned in the position of use of the wood-treatment apparatus.

12. The wood-treatment apparatus according to claim 1, wherein the outer end of the cylindrical hollow body comprises a head and wherein the inner end of the cylindrical hollow body comprises a drive-in tip, wherein a section of the cylindrical hollow body positioned between the head and the drive-in tip is comprised of aluminum, and wherein at least one of the drive-in tip and the head is comprised of brass or of stainless steel.

13. The wood-treatment apparatus according to claim 1, wherein an exterior side of the cylindrical wall surface of the cylindrical hollow body comprises anchoring means to secure the wood-treatment apparatus in the position of use in the wood.

14. A method for the treatment of wood by using a wood-treatment apparatus according to claim 1, the method comprising:
provide the cylindrical hollow body and the sleeve of the wood treatment apparatus;
introducing the carrier material with the active wood-treatment substance active against tree diseases or tree infestations into the accommodating space of the cylindrical hollow body of the wood-treatment apparatus and closing off the at least one exit opening in the cylindrical wall surface by arranging the sleeve about the cylindrical hollow body so as contact the cylindrical hollow body circumferentially;
driving the wood-treatment apparatus into the wood into a position of use to position the at least one exit opening in or near a site to be treated in the wood, thereby axially displacing the sleeve or axially compressing the sleeve along the cylindrical hollow body and opening the at least one exit opening from the inner end toward the outer end of the cylindrical hollow body to provide an open connection between the accommodating space and the wood via the at least one exit opening, and thereby bringing into contact the accommodating space with the wood;
allowing the wood-treatment apparatus to remain in the wood and thereby releasing, by capillary action and/or by diffusion, the active wood-treatment substance active against tree diseases or tree infestations pressureless into the wood through the at least one exit opening.

15. The method according to claim 14, further comprising leaving behind the cylindrical hollow body of the wood-treatment apparatus in the wood after completely driving in the wood-treatment apparatus into the wood.

16. The method according to claim 14, wherein the wood-treatment apparatus is driven into a hole that is present in the wood.

17. The method according to claim 14, further comprising, prior to providing the cylindrical hollow body and the sleeve of the wood treatment apparatus, the steps of:
removing a wood sample from the wood;
examining the wood sample with respect to a decay-causing fungus type;
when a decay-causing fungus-type is found, selecting a suitable active wood-treatment substance for treating the decay-causing fungus type.

18. The method according to claim 17, further comprising introducing the suitable active wood-treatment substance into the carrier material.

19. The method according to claim 14, wherein, in the step of driving the wood-treatment apparatus into the wood into a position of use, the wood-treatment apparatus is driven only to a predetermined depth into the wood so that the at least one exit opening is arranged in or near the site to be treated and so that the carrier material with the active wood-treatment substance active against tree diseases or tree infestations is released in a targeted fashion in and adjacent to the site to be treated.

* * * * *